(12) United States Patent
Fujii et al.

(10) Patent No.: US 7,145,327 B2
(45) Date of Patent: Dec. 5, 2006

(54) ROTATIONAL POSITION DETECTOR AND RECORDING-REPRODUCING UNIT UTILIZING THE SAME

(75) Inventors: Norio Fujii, Kyoto (JP); Toshiya Suzuki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 71 days.

(21) Appl. No.: 10/966,739

(22) Filed: Oct. 15, 2004

(65) Prior Publication Data

US 2005/0083044 A1    Apr. 21, 2005

(30) Foreign Application Priority Data

Oct. 16, 2003  (JP) .............................. 2003-356946
Aug. 17, 2004  (JP) .............................. 2004-237035

(51) Int. Cl.
*G01B 7/30* (2006.01)
(52) U.S. Cl. .................................. 324/207.25; 324/173
(58) Field of Classification Search ........... 324/207.25, 324/173
See application file for complete search history.

(56) References Cited

U.S. PATENT DOCUMENTS 5,349,257 A * 9/1994 Hernden ................... 310/68 B

FOREIGN PATENT DOCUMENTS

JP        02-010569       1/1990

* cited by examiner

*Primary Examiner*—Reena Aurora
(74) *Attorney, Agent, or Firm*—Hogan & Hartson LLP

(57) ABSTRACT

A rotor of a sensor-less motor has a multiplicity of magnetic poles, with one magnetic pole giving a smaller magnetic flux than other the magnetic poles. A coil is provided at a predetermined position external to the rotor. An induction signal is generated in the coil as the magnetic flux through it is changed by the rotation of the rotor. An index signal indicative of the reference rotational position of the rotor is generated based on the change in the induction signal. Thus, the reference rotational position of the disk of an information recording-reproducing unit, for example, can be detected without utilizing any Hall elements.

5 Claims, 11 Drawing Sheets

ROTATIONAL POSITION DETECTOR AND RECORDING-REPRODUCING UNIT UTILIZING THE SAME

FIELD OF THE INVENTION

The invention relates to a rotational position detector for detecting the rotational position of a rotational recording medium that is directly driven by a sensor-less motor in a recording-reproducing unit, and to a recording-reproducing unit utilizing such rotational position detection unit.

BACKGROUND OF THE INVENTION

Information recording-reproducing units for recording and/or reproducing video and audio information on a rotational recording medium such as FDs (flexible disks), CDs (compact disks), DVDs (digital versatile disks), MDs (mini-disks), and HDs (hard disks), have been widely used. In order to control recording and reproduction of information correctly on a disk, it is necessary for such recording-reproducing unit to have a device for detecting the initial and final rotational positions of the disk associated with the information.

Conventionally, the rotational potion of the disk is detected based on an index signal, which is generated from a signal (rotor rotation signal) indicative of the rotation of the rotor of a motor rotating the disk once for every rotation of the disk. For example, a rotational position detector for use with a conventional FDD system generates a pulsed index signal for each rotation of an FD.

FIG. 11 shows a brushless motor having a conventional rotational position detector. This rotational position detector includes: a rotor having a multiplicity (8 in the example shown) of drive magnetic poles 11; a stator having Hall elements 2 for detecting the magnetic fluxes of the drive magnetic poles 11 to generate 3-phase Hall output signals HU, HV, and HW for controlling driving of the motor, and 3-phase drive coils 13; and a brushless motor drive circuit 15 for switching drive current to the 3-phase drive coils 13 in response to a drive magnetic pole position signal. The motor shown in FIG. 11 is equipped with a sensor for controlling driving of the motor using the Hall signals HU, HV, and HW.

In this rotational position detector, one of the drive magnetic poles of the rotor (the pole referred to as weak magnetic pole) has a non-magnetic region 12 to reduce the magnetic flux of that pole as compared with other the magnetic poles. Thus, the amplitude of the output signal generated by a smaller magnetic flux in the Hall element 2 facing the weak magnetic pole is smaller than that generated by other poles. This can be utilized to generate an index signal.

Of the 3-phase Hall signals HU, HV, and HW, the Hall signal HW associated with W phase is used by the rotational position detector of FIG. 11 to generate the index signal. The Hall signal HW is supplied to an amplifier circuit 3 to generate an amplified Hall output signal Vhw.

The maximum level, i.e. peak value, of the Hall signal Vhw is held in a peak hold circuit 4. A reference signal Vr having a predetermined magnitude relative to the peak value Vhwp is generated by a reference voltage generation circuit 5. A voltage comparison circuit 6 compares the Hall output signal Vhw with the reference signal Vr to generate a comparison output in association with the weak magnetic pole. Based on the comparison output and the signal output from a waveform shaping circuit 16 waveform shaping the Hall output signal Vhw, a discrimination circuit 17 generates one index signal for each rotation of the disk (reference 1: JP-2569736).

In recent years, in an effort to make FDD and HDD less influenced by design limitations on the dimensions (in height and area) thereof, and to reduce in number and in cost power lines, lead wires, and Hall elements in a brushless motor, sensor-less brushless motors utilizing no such 3-phase Hall elements have been increasingly used.

These sensor-less motors also require at least one Hall element to generate an index signal, since it is still necessary for these motors used in information recording-reproducing units to provide an index signal in association with the rotation of the disk. However, provision of a Hall element in the sensor-less motor solely for generating the index signal still presents a design limitation and cost problem to the motor.

SUMMARY OF THE INVENTION

It is, therefore, an object of the invention to provide a rotational position detector for use with an information recording-reproducing unit, the rotational position detector utilizing a sensor-less motor but no Hall element as a sensor. Thus the rotational position detector is less limited by design limitations and is cost-effective, yet capable of successfully generating an index signal indicative of the rotation of a disk.

It is another object of the invention to provide an information recording-reproducing unit equipped with such rotational position detector.

In accordance with one aspect of the invention, there is provided a rotational position detector for detecting the reference rotational position of the rotor of a motor, the rotor having a multiplicity of magnetic poles arranged along the circumference of the rotor such that one of the magnetic poles or a pair of the magnetic poles generate(s) magnetic flux different in magnitude from the magnetic flux generated by other the magnetic poles, the rotational position detector comprising:

coil means provided at a predetermined position external to the rotor, for generating therein an induction signal associated with the change in flux caused by the rotation of the rotor, and a signal processing circuit for generating, upon receipt of the induction signal, an index signal indicative of the reference rotational position based on the change in the induction signal.

The signal processing circuit may have:

a peak hold circuit for holding the maximum level, or peak value, of the input signal associated with the induction signal;

a reference signal generation circuit for generating a reference signal in accordance with the peak value;

a level comparator for generating a level comparison signal based on the level comparison of the input signal and the reference signal;

a waveform shaper for waveform shaping the input signal based on a predetermined threshold to generate a waveform shaping signal; and a signal synthesizing circuit for synthesizing the level comparison signal and waveform shaping signal to generate the index signal.

The signal processing circuit may be adapted to convert the input signal into a digital signal and digitally execute the signal processing in the peak hold circuit, reference signal generation circuit, and level comparator.

The multiplicity of magnetic poles may be of permanent magnets, with one magnetic pole or a pair of magnetic poles (referred to as intensified magnetic pole(s)) providing a larger magnetic flux than other magnetic poles. The signal synthesizing circuit can generate the index signal based on the ending of the waveform shaping signal immediately after the generation of the level comparison signal.

The multiplicity of magnetic poles may be of permanent magnet, with one magnetic pole or a pair of magnetic poles providing a smaller magnetic flux than other magnetic poles. The signal synthesizing circuit may be adapted to generate the index signal based on the ending of the associated waveform shaping signal when the level comparison signal is not generated during the period between the generation and the ending of the waveform shaping signal.

In the inventive rotational position detector, the multiplicity of magnetic poles are of permanent magnets, with one magnetic pole or a pair of magnetic poles may provide a larger magnetic flux than other magnetic poles, and the signal processing circuit may have:

a peak hold circuit for holding the maximum level, or peak value, of the input signal associated with the induction signal;

a reference signal generation circuit for generating a reference signal in accordance with the peak value;

a level comparator for generating a level comparison signal based on the level comparison of the input signal and the reference signal;

a mask signal generation circuit for generating a mask signal having a predetermined width starting from the time when the level comparison signal changes in level;

a waveform shaper for waveform shaping the input signal based on a predetermined threshold to generate a waveform shaping signal; and a signal synthesizing circuit for generating the index signal based on the level comparison signal, mask signal, and waveform shaping signal. The signal synthesizing circuit may form a masked level comparison signal by masking the noise contained in the level comparison signal with the mask signal, and generate the index signal based on the ending of the waveform shaping signal immediately after the formation of the masked level comparison signal.

In the rotational position detector, the multiplicity of magnetic poles may be of permanent magnets, with one magnetic pole or a pair of magnetic poles providing a smaller magnetic flux than other magnetic poles, and the signal processing circuit may have:

a peak hold circuit for holding the maximum level, or peak value, of the input signal associated with the induction signal;

a reference signal generation circuit for generating a reference signal in accordance with the peak value;

a level comparator for generating a level comparison signal based on the level comparison of the input signal and the reference signal;

a waveform shaper for waveform shaping the input signal based on a predetermined threshold to generate a waveform shaping signal;

a first mask signal generation circuit for generating a first mask signal having a predetermined width starting from the time when the level comparison signal changes in level;

a second mask signal generation circuit for generating a second mask signal having a predetermined width starting from the time when the level comparison signal changes in level; and a signal synthesizing circuit for generating the index signal based on the level comparison signal, second mask signal, waveform shaping signal, and first mask signal. The signal synthesizing circuit is adapted to:

form a masked waveform shaping signal by masking the noise contained in the waveform shaping signal with the first mask signal;

form a masked level comparison signal by masking the noise contained in the level comparison signal by means of the second mask signal; and generate the index signal based on the ending of the masked waveform shaping signal when the masked level comparison signal is not formed during the period between the beginning and the ending of the masked waveform shaping signal.

A recording-reproducing unit may be equipped with a rotational recording medium drive that utilizes the inventive rotational position detection device.

By use of a coil, the invention enables elimination of dimensional design limitations on the rotational position detector and production of a more cost-effective rotational position detector as compared with conventional rotational position detectors that utilizes Hall elements to detect magnetic flux.

The invention utilizes a signal induced in the coil (the signal referred to as induction signal) generated by a change in magnetic flux through the coil. Accordingly, the invention presents a practical merit that the power consumption by a rotational position detector can be suppressed, since it is not necessary to keep a current flowing through the device as is necessary in conventional devices.

Although noise can be involved in the induction signal (or input signal of the detector) due to switching of the drive circuit of the motor, detection of an erroneous index signal can be circumvented by the use of a noise mask circuit adapted to mask the noise in the waveform shaping signal and level comparison signal, as stated above.

DETAILED DESCRIPTION OF THE PREFERRED EMBODIMENTS

Figure 11:
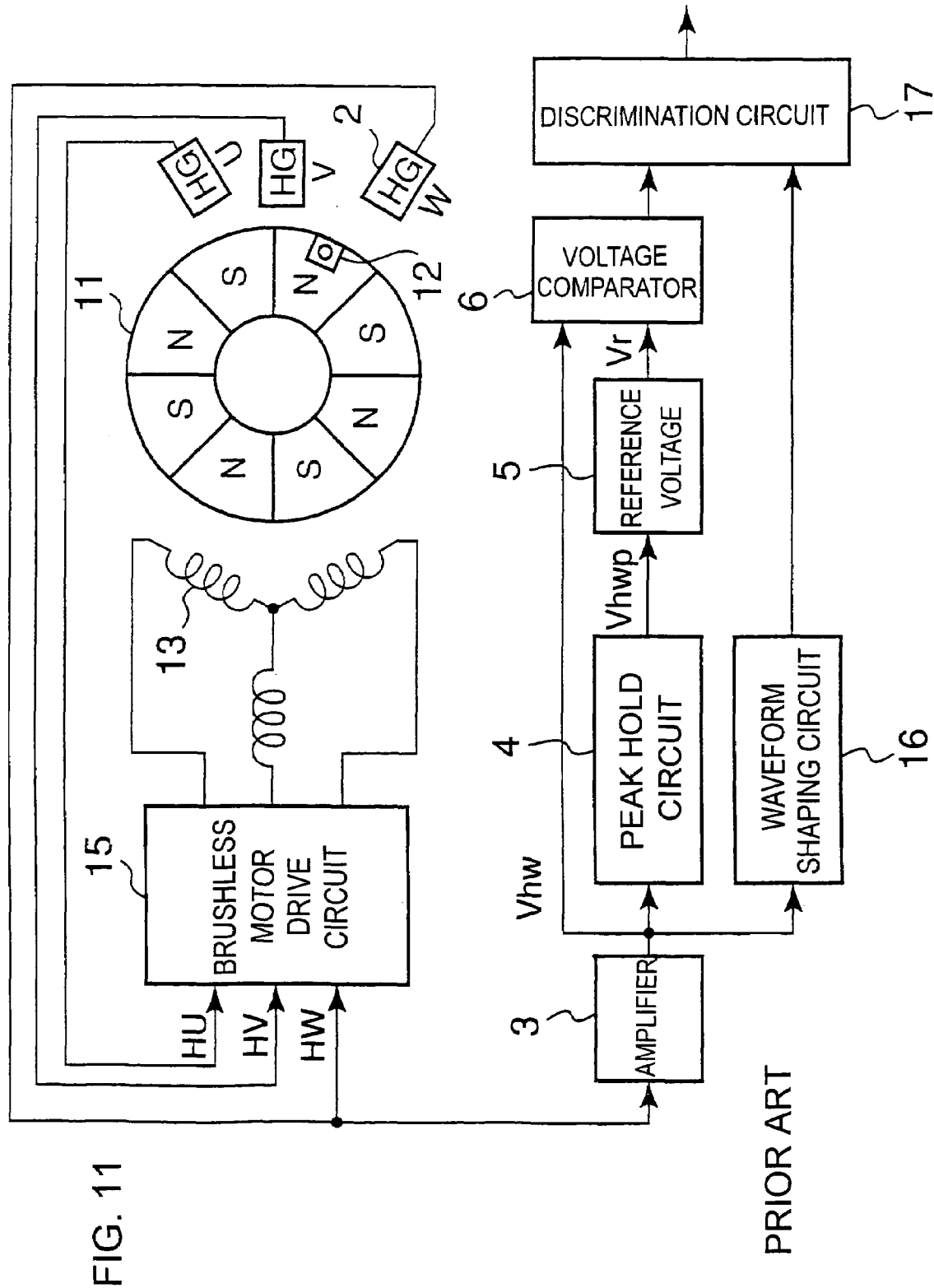
FIG. 11 is a schematic diagram of a conventional rotational position detector.

The invention will now be described in detail by way of example with reference to the accompanying drawings. Like conventional rotational position detectors as shown in FIG. 11, a rotational position detector of the invention generates one pulsed index signal for every rotation of a disk such as FD, CD, DVD, MD, and HD. The rotational position detector of the invention may be used with a disk drive of an information recording-reproducing unit.

In the invention, a sensor-less motor having no Hall element is used as a motor for such disk drive. The sensor-less motor has a stator which has a three-phase driving coil 13, and a rotor having a multiplicity (8 for example) of magnetic poles along the circumference of the rotor, with one magnetic pole or a pair of magnetic poles providing a different magnetic flux than that of other magnetic poles.

That one magnetic pole or pair of magnetic poles may be magnetized to provide a larger magnetic flux or a smaller magnetic flux than other magnetic poles. Alternatively, instead of magnetizing the magnetic pole(s) to provide a larger or a smaller magnetic flux, the magnetic pole(s) may be partially replaced by a non-magnetic material.

In the invention, a change in flux accompanying the rotation of the rotor is detected by detecting a change in the induction signal generated in a coil. Although the coil cannot detect magnetic flux itself, it can detect a change in magnetic flux. Since the index signal is required only when the rotor is in rotation, the coil is an especially suitable means for detecting the change in magnetic flux.

Figure 1:
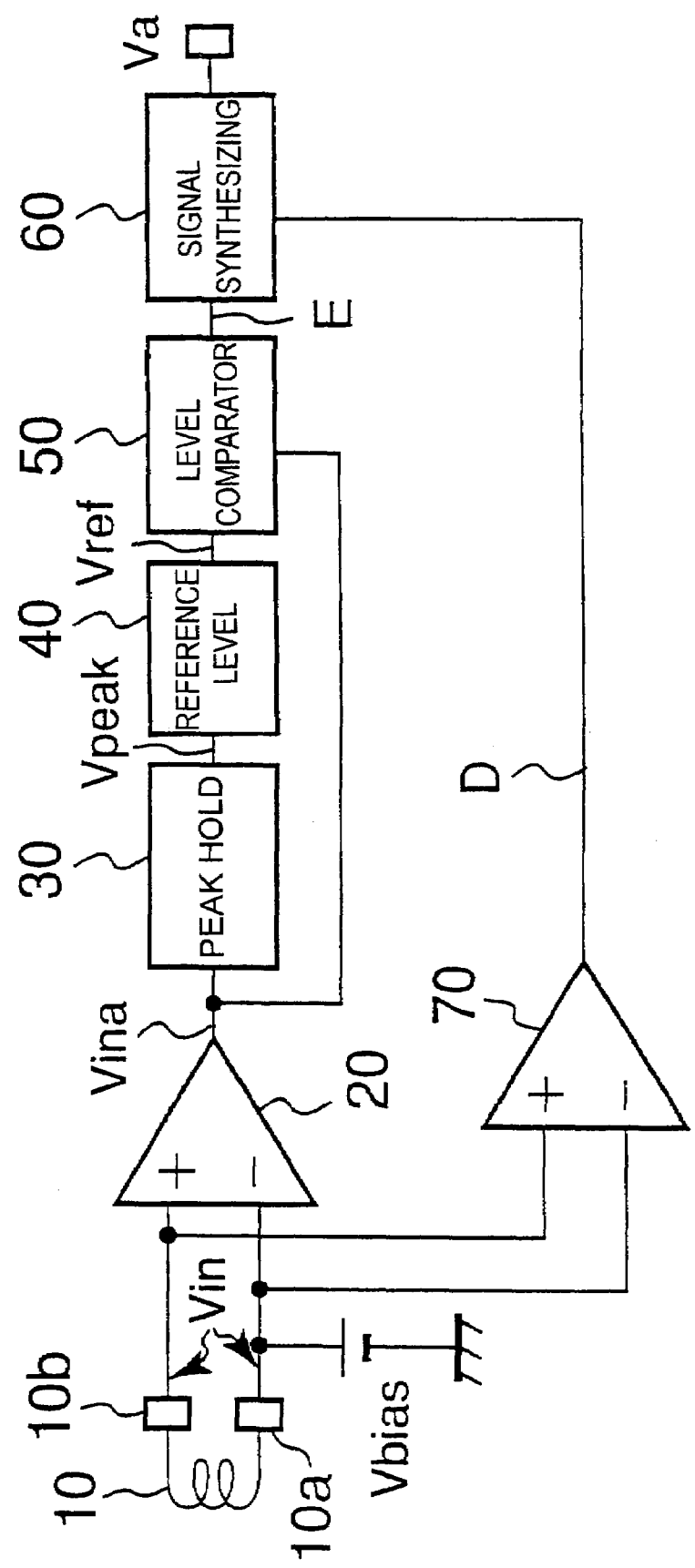
FIG. 1 is a block diagram representation of a rotational position detector in accordance with a first embodiment of the invention.
Figure 2:
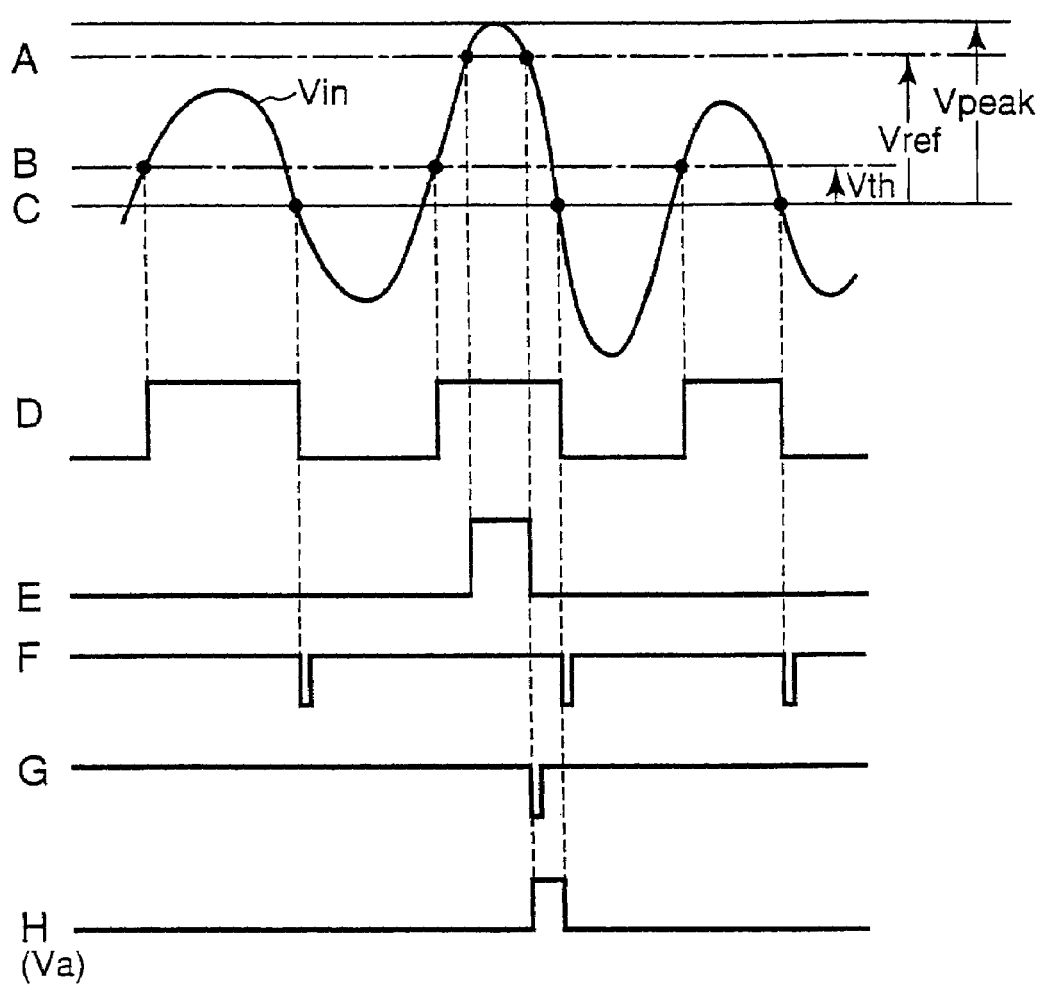
FIG. 2 is a timing diagram describing the operational principle of the rotational position detector of FIG. 1.

FIG. 1 is a block diagram showing a rotational position detector in accordance with a 'first' embodiment of the invention, and FIG. 2 is a timing diagram describing the operational principle of the rotational position detector. In the first embodiment, one magnetic pole (referred to as intensified magnetic pole) provides a larger magnetic flux than other magnetic poles.

There is shown in FIG. 1 a coil 10 for generating an induction signal (or electromagnetic force, EMF) Vin in accord with a change in magnetic flux accompanying the rotation of the rotor of the sensor-less motor. The coil 10 is arranged at a predetermined position external to the rotor, preferably on the stator, of the sensor-less motor. When the coil 10 is provided on the stator, one of the three-phase (U-, V-, and W-phase) driving coils may be used as the coil 10.

Since the induction signal Vin generated in the coil 10 depends on the change in magnetic flux through the coil, it is generated based on a different principle governing Hall effect, in which the voltage generated depends on the magnetic flux. Nevertheless, the EMF generated in the coil 10 can be effectively utilized to generate the index signal Va, since the index signal Va is required only when the rotor is in rotation.

The induction signal Vin is input, via input terminals 10a and 10b, to a control IC for example having a built-in signal processing circuit. Voltage Vbias is a bias voltage to determine a reference operational voltage. Based on the change in level of the induction signal Vin, the signal processing circuit generates and outputs an index signal Va indicative of the reference rotational position of the disk.

In the signal processing circuit, the input signal Vin is supplied to a difference input circuit 20 and to a waveform shaper 70. The difference input circuit 20 performs differential amplification of the input signal Vin and generates an input amplification signal Vina, which is fed to a peak hold circuit 30 for holding the peak value Vpeak of the input amplification signal Vina.

A reference signal generation circuit 40 receives the peak value Vpeak from the peak hold circuit 30 and generates a reference signal Vref that is smaller in magnitude than the peak value Vpeak by a predetermined factor. Thus, the magnitude of the reference signal Vref is automatically determined by the peak value Vpeak of the input amplification signal Vina. The magnitude of the predetermined factor is determined by the ratio of the level of the induction signal generated by one magnetic pole providing a larger magnetic flux (the magnetic pole referred to as intensified magnetic pole) to the level of the induction signals generated by other magnetic poles. That is, the level of the reference signal Vref is lower than that of the induction signal generated by the intensified magnetic pole and higher than the level of the induction signals generated by other magnetic poles. For example, the ratio may be about 0.70.

A numeric comparator (referred to as level comparator) 50 compares the level of the input amplification signal Vina received from the difference input circuit 20 with the level of the reference signal Vref, and generates a level comparison signal E when the input amplification signal Vina exceeds the reference signal.

The waveform shaper 70 performs waveform shaping on the input signal Vin to generate a waveform shaping signal D. The waveform shaper 70 may alternatively perform waveform shaping on the input amplification signal Vina instead of the input signal Vin. In this sense the input amplification signal Vina will be also referred to as input signal Vin.

It is noted here that in actuality the coil 10 can contain an error voltage superposed on the induction signal, due to the electromagnetic induction by a flux leaking from the magnetic poles driving the motor. In order to eliminate the influence of chattering due to the error voltage, the waveform shaper 70 is preferably a hysteresis comparator having a (one-sided or double-sided) hysteresis characteristic. The threshold Vth of the hysteresis may be set to an arbitrary level, slightly larger than the error voltage. This causes the waveform shaping signal D to be generated over a period of time from the instant at which the input signal Vin exceeds the threshold level Vth to the instant at which the input signal Vin drops to zero.

A signal synthesizing circuit 60 forms the index signal Va based on the level comparison signal E and waveform shaping signal D. In the example shown herein, the signal synthesizing circuit 60 is formed of a set-reset type flip-flop (SR-type FF) circuit.

Operation of the first embodiment will now be described with reference to the timing diagram of FIG. 2. The input signal Vin changes in time relative to the zero level C, as shown. Level B indicates the threshold level Vth of the waveform shaper 70, and level A indicates the level of the reference signal Vref.

The waveform shaping signal D is output from the waveform shaper 70, which goes high when the input signal Vin exceeds the threshold level Vth and goes low when the input signal Vin crosses the zero level. The level comparison signal E is output from the level comparator 50 while the input signal Vin exceeds the reference signal Vref.

Signal F is a falling-edge signal that goes low when it is generated at a falling edge of the waveform shaping signal D. Signal G is also a falling-edge signal generated at a falling edge of the level comparison signal E.

Output signal H is a rising-edge signal which goes high at a falling edge of the signal G and goes low at a falling edge of the signal F. The output signal H is provided as the index signal Va.

The input signal Vin changes with the rotational position of the motor, as shown in FIG. 2. While the coil 10 is facing a magnetic pole other than the intensified magnetic pole, the level of the input signal Vin will not reach the level of the reference signal Vref. Then the waveform shaping signal D is generated (pulled up), but the level comparison signal E is not generated (remains low). Hence the output signal H is not generated.

As the motor rotates, bringing the intensified magnetic pole to face the coil 10, the waveform shaping signal D is generated, together with the level comparison signal E. This causes the output signal H to be generated (pulled up) by the falling-edge signal G and to be ended (pulled low) by the falling-edge signal F. Thus, the index signal Va is obtained based on, or in association with, the fall (or ending) of the output signal H.

Thus, the signal synthesizing circuit 60 generates the index signal Va based on the ending (fall) of the waveform shaping signal D immediately after the generation of the level comparison signal E.

Figure 3:
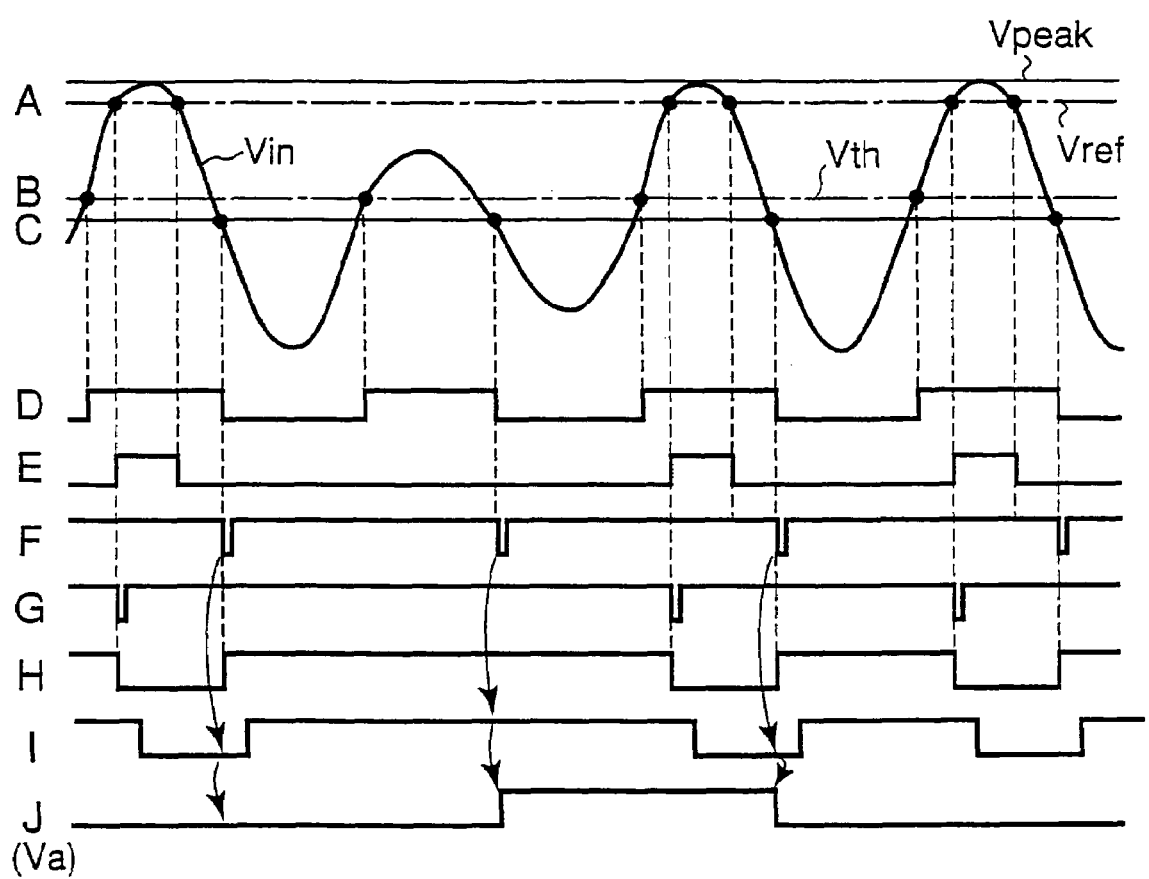
FIG. 3 is a timing diagram describing the operational principle of a rotational position detector in accordance with a second embodiment of the invention.

FIG. 3 is a timing diagram describing the operational principle of a rotational position detector in accordance with a second embodiment of the invention. The second embodiment differs from the first embodiment in that one magnetic pole provides a smaller magnetic flux than other magnetic poles. (The magnetic pole providing a smaller magnetic flux will be referred to as weak magnetic pole.)

The circuit structure of the second embodiment is substantially the same as that of the first embodiment of FIG. 1. In the second embodiment, however, the signal synthesizing circuit 60 is constructed using a data type flip-flop (D type FF) circuit.

Operation of the second embodiment will now be described with reference to the timing diagram shown in FIG. 3, with emphases placed on features not found in the first embodiment (FIG. 2).

Signals A through F are the same in nature as those shown in FIG. 2. However, due to the fact that one magnetic pole provides a smaller magnetic flux than other magnetic poles, the signals A through F of the second embodiment have different waveforms and frequencies of occurrence as compared to the corresponding signals of the first embodiment (FIG. 2), as shown in FIG. 3.

In the second embodiment shown herein, signal G is a rising-edge signal that rises at a rising edge of the level comparison signal E.

Signal H is a pulse signal that goes low at a falling edge of the rising-edge signal G and goes high at a falling edge of the falling-edge signal F. Signal I is a delay signal obtained by delaying the signal H by a predetermined short period of time. This delay can be easily obtained using a D-type FF and a clock signal.

Signal J is an output signal of the rotational position detector, generated in accord with the level of the delayed signal I at the instant the falling-edge signal F is generated. This output signal J serves as the index signal Va of the second embodiment.

The input signal Vin is varied by the rotation of the motor as shown in FIG. 3. The level of the input signal Vin reaches the level of the reference signal Vref while the coil 10 is facing a magnetic pole other than the weak magnetic pole. As a consequence, the level comparison signal E is generated while the waveform shaping signal D is generated.

As stated above, the pulse signal H and delayed signal I, which are pulled low at the falling edge of the rising-edge signal G and pulled up at the falling edge of the falling-edge signal F, are generated. In this case, the output signal J is not generated, since the delayed signal I is pulled to its low (L) level when the falling-edge signal F is generated.

As the motor rotates, causing the coil 10 to face the weak magnetic pole, the waveform shaping signal D will be generated, but the level comparison signal E will not be generated. Under this condition, the delayed signal I has been pulled to its high (H) level, since the rising-edge signal G is not generated then. Hence, the output signal J rises when the next falling-edge signal F is generated. The output signal J goes low as the coil 10 faces the next magnetic pole providing a larger magnetic flux than the weak magnetic pole.

Thus, under the condition that the rising-edge signal G is not generated, the output signal J is generated when the next falling-edge signal F is generated. The index signal Va is provided when the output signal J is generated (going high), or in association with the output signal J going high.

In this way, the signal synthesizing circuit 60 generates the index signal Va based on the ending of the waveform shaping signal D if the level comparison signal E is not generated during a period between the generation and ending of the waveform shaping signal D.

Figure 4:
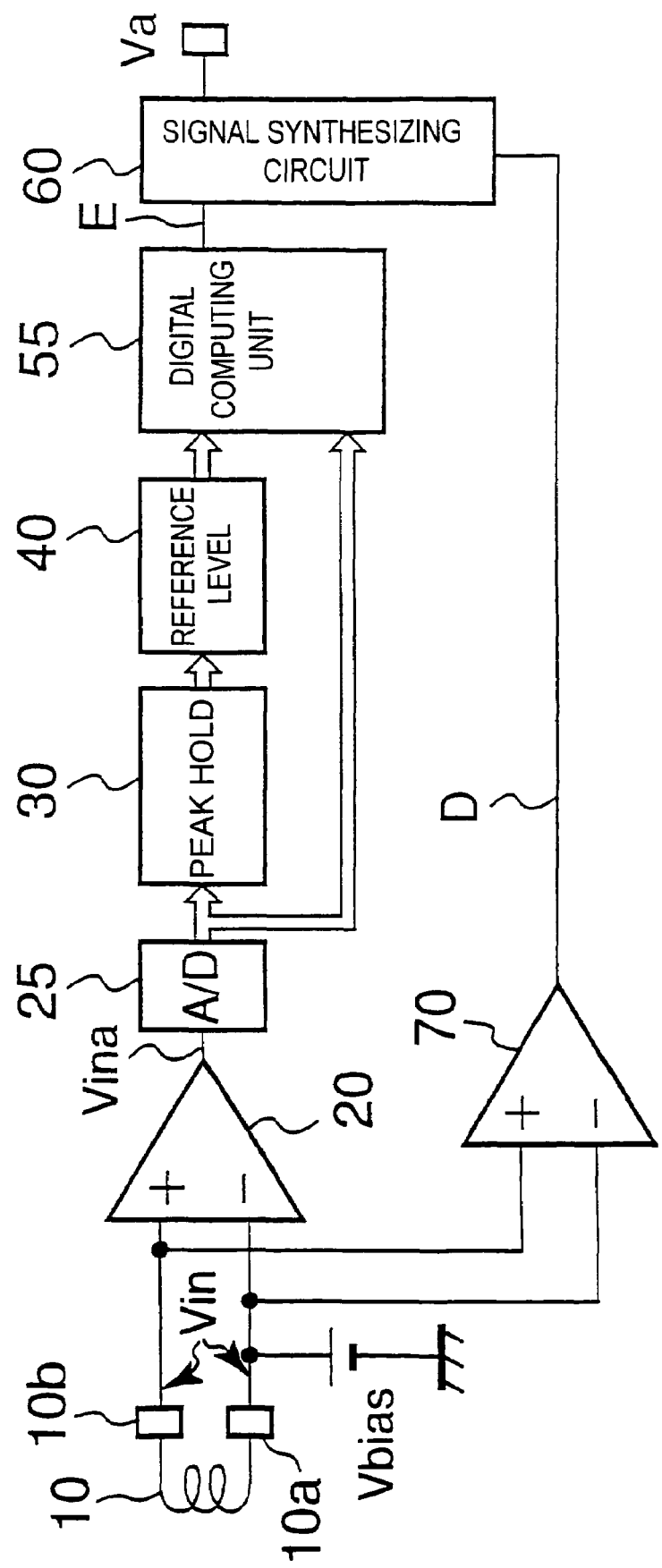
FIG. 4 is a block diagram representation of a rotational position detector in accordance with a third embodiment of the invention.

FIG. 4 is a block diagram showing a rotational position detector in accordance with a third embodiment of the invention. Like elements shown in FIGS. 1 and 2 are indicated by like reference numerals in FIG. 4. As seen in FIGS. 1–4, the difference between the third embodiment and the first/second embodiment is that the third embodiment is provided, between the difference input circuit 20 and the peak hold circuit 30, with an A/D converter 25 for converting the analog input signal Vina into a digital signal, thereby enabling digital processing of the input signal Vina in the subsequent circuits. Other features of the third embodiment are the same as in the first embodiment.

Thus, in the rotational position detector shown herein, the levels of the digitized input signal Vina and the reference signal Vref generated from the digitized input signal Vina are compared in a digital computing unit 55, the output of which (referred to as level comparison output) is synthesized with the wave-shaped output of a one-sided hysteresis comparator 70 to obtain the index signal Va.

Figure 5:
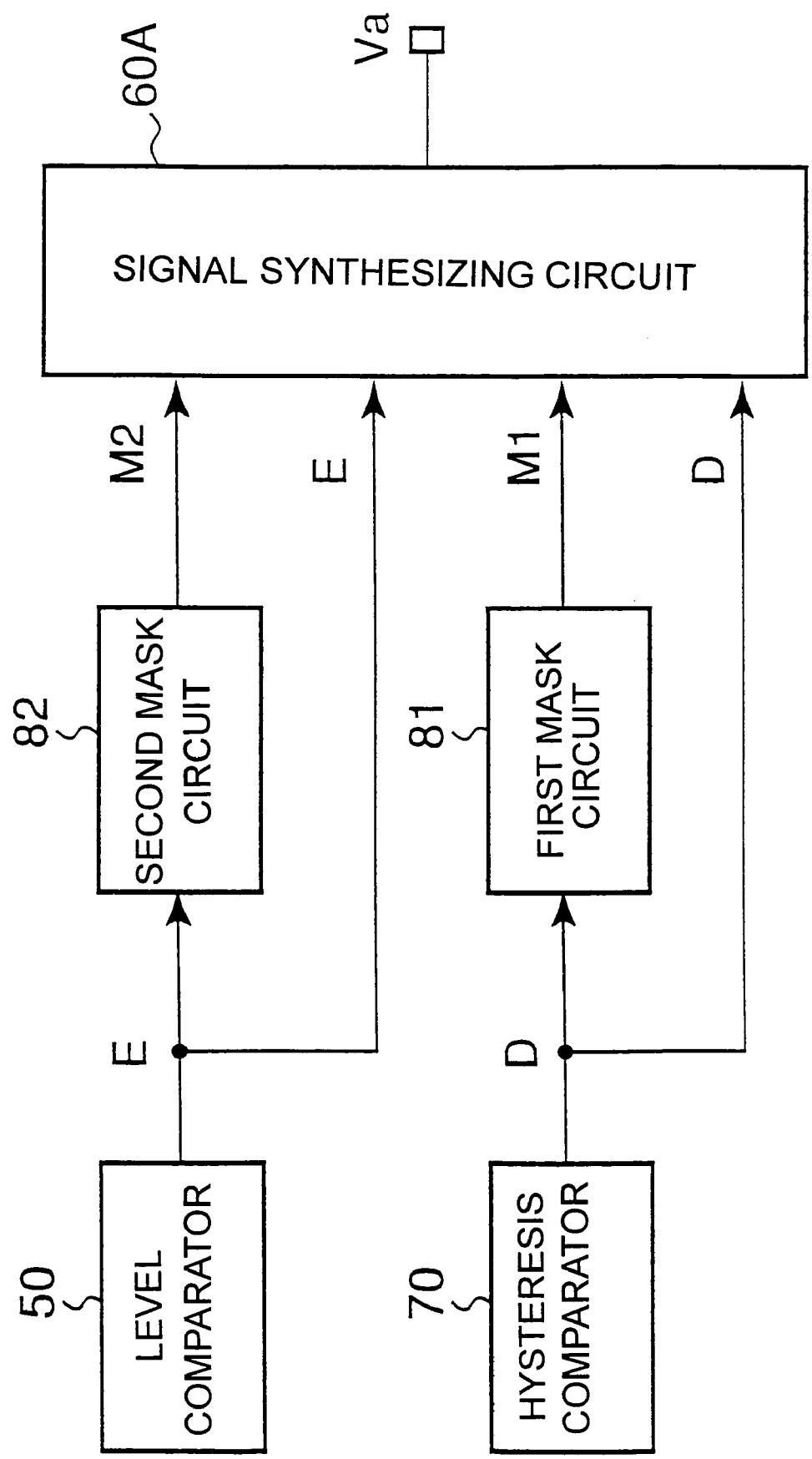
FIG. 5 is a block diagram representation of a rotational position detector in accordance with a fourth embodiment of the invention.
Figure 6:
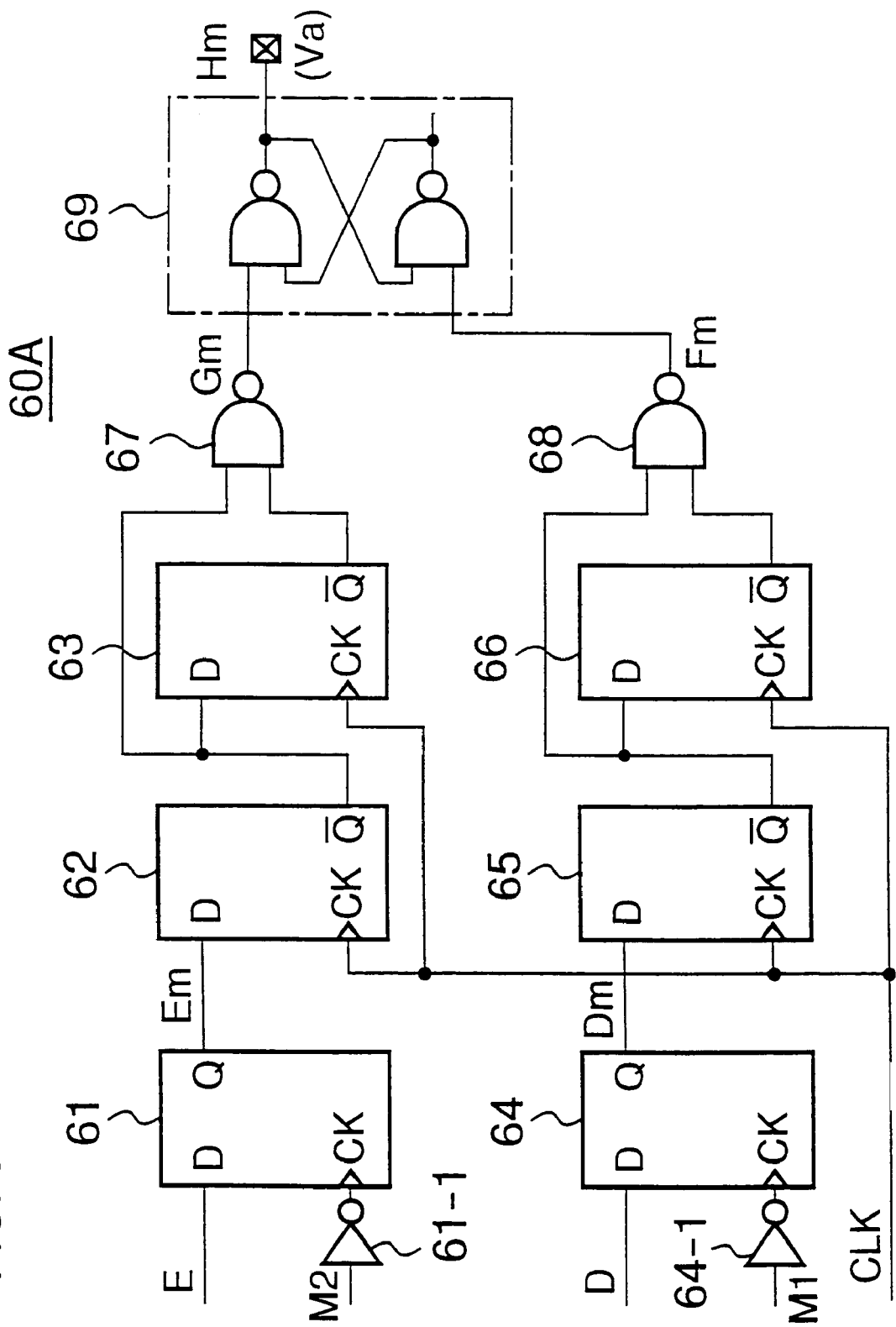
FIG. 6 is a circuit diagram of the signal synthesizing circuit for use with a rotational position detector in accordance with the fourth embodiment of the invention.
Figure 7:
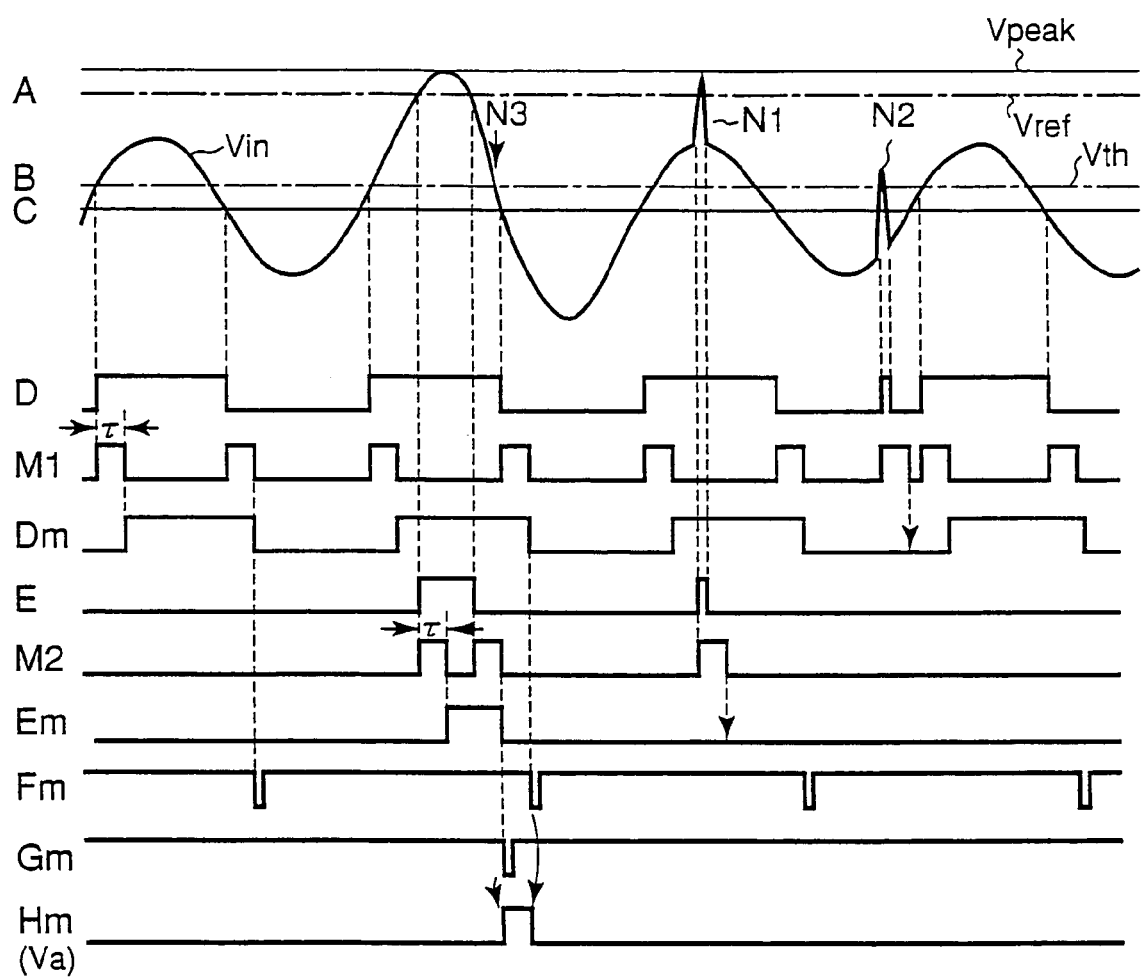
FIG. 7 is a timing diagram describing the operational principle of a rotational position detector in accordance with the fourth embodiment of the invention.

FIG. 5 is a partial block diagram of a rotational position detector in accordance with a fourth embodiment of the invention. FIG. 6 shows an internal structure of the signal synthesizing circuit 60A of FIG. 5. FIG. 7 is a timing diagram illustrating the operational principle of the rotational position detector. In the fourth embodiment, one magnetic pole (intensified magnetic pole) has a larger magnetic flux than other magnetic poles, as in the first embodiment.

It is noted that the induction signal (or input signal) Vin generated in the coil can be superposed with noise that results from switching of the drive circuit of the motor. The fourth embodiment is provided with a noise mask circuit for masking such noise contained in the waveform shaping signal D and level comparison signal E, thereby circumventing detection of an erroneous index signal.

As shown in FIG. 5, the waveform shaping signal D output from the hysteresis comparator 70 is input to a first mask circuit 81 to form a first mask signal M1. Together with the waveform shaping signal D, the first mask signal M1 is input to the signal synthesizing circuit 60A to form a masked waveform shaping signal Dm by masking the noise contained in the waveform shaping signal D.

The level comparison signal E, output from the level comparator 50, is input to a second mask circuit 82 to form a second mask signal M2. The second mask signal M2 is input, together with the level comparison signal E, to the signal synthesizing circuit 60A to mask the noise contained in the level comparison signal E, thereby forming a masked level comparison signal Em.

Components of the fourth embodiment other than the first and second mask circuits 81 and 82, respectively, and the signal synthesizing circuit 60A are the same as those shown in FIG. 1. Therefore, those components shown in FIG. 1 will not be described further, and omitted in FIG. 5.

Signals A–C, waveform shaping signal D, and level comparison signal E shown in FIGS. 6 and 7 are the same as those shown in FIGS. 1 and 2. Clock CLK is a timing clock signal for use in timing operation in the signal synthesizing circuit 60A. The clock CLK preferably has a predetermined high frequency, and hence a predetermined period of cycle determined by that frequency.

The first noise mask signal M1 that lasts for a predetermined period τ is generated at a rising edge and at a falling edge of the waveform shaping signal D, as shown in FIG. 7. Since the first noise mask signal M1 is intended to mask the noise generated by the switching of the drive circuit of the motor, the period τ is preferred to be slightly longer than the width of the switching noise. The first mask signal M1 can be easily formed by any known pulse signal processing technique.

The second noise mask signal M2 that lasts for a predetermined period τ is generated at a rising edge and at a falling edge of the level comparison signal E, as shown in FIG. 7. The length of the period τ may be the same as that of the first mask signal M1.

The signal synthesizing circuit 60A has a D-type FF 61 that is provided at the clock terminal thereof with the second mask signal M2 via an inverting circuit 61-1, and at the data terminal thereof with the level comparison signal E, and outputs from the output terminal thereof a masked (or noise-free) level comparison signal Em. The masked level comparison signal Em is formed when the level comparison signal E lasts longer than the predetermined time τ, in such a way that the masked level comparison signal Em has the same waveform as the level comparison signal E but is shifted from E by the predetermined time τ. However, the masked pulse level comparison signal Em is not formed when the level comparison signal E does not last longer than the predetermined time τ. The masked (i.e. noise-free) level comparison signal Em is obtained in this way.

The first mask signal M1 is input to the clock terminal of a D-type FF 64 via an inverting circuit 64-1, and the waveform shaping signal D is input to the data terminal of the D-type FF 64 to output the noise-free masked waveform shaping signal Dm from the output terminal of the D-type FF 64. The masked waveform shaping signal Dm is formed when the waveform shaping signal D lasts longer than the predetermined time τ, in such a way that the masked waveform shaping signal Dm has the same waveform as the waveform shaping signal D but is shifted by the predetermined time τ. However, the masked waveform shaping signal Dm is not formed when the waveform shaping signal D does not last longer than the predetermined time τ. The masked (i.e. noise-free) waveform shaping signal Dm is obtained in this way. Although the predetermined shift time τ can be different for the first and second mask signals M1 and M2, respectively, τ can be the same in most cases.

Referring to FIG. 7, there is shown an exemplary input signal Vin superposed with noise N1 exceeding the reference signal Vref and noise N2 varying from below zero level to a level above the threshold level Vth. Noise N1 will generate, in the level comparison signal E, a noise-originating pulse having the same width as noise N1. In the case of the first embodiment shown in FIG. 1, such noise N1, if any, that generates a noise-originating pulse in the level comparison signal E would result in an erroneous index signal Va.

In the fourth embodiment shown in FIGS. 6 and 7, however, since noise N1 is masked by the second mask signal M2, no noise-originating signal will be generated in the masked level comparison signal Em.

Likewise, noise N2 will generate a noise-originating pulse having the same width as noise N2 in the waveform shaping signal D. However, since the noise-originating pulse due to noise N2 appearing in the waveform shaping signal D is removed by the first mask signal M1, no noise-originating signal due to noise N2 is generated in the masked waveform shaping signal Dm.

The masked level comparison signal Em and clock CLK are respectively input to a falling edge detection circuit formed of D-type FFs 62 and 63 and a NAND circuit 67 to generate a falling-edge signal Gm at a falling edge of the masked level comparison signal Em.

The masked waveform shaping signal Dm and clock CLK are respectively input to a falling edge detection circuit formed of D-type FFs 65 and 66 and a NAND circuit 68 to generate a falling-edge signal Fm upon detection of a falling edge of the masked waveform shaping signal Dm. It is noted that the falling edge detection circuit can be used also as a circuit for generating the falling-edge signals F and G as shown in FIG. 2.

As the motor rotates, bringing the coil 10 to face the intensified magnetic pole, the masked waveform shaping signal Dm and the masked level comparison signal Em will be formed. This causes masked falling-edge signals Gm and Fm to be generated, and causes the SR-FF 69 to be reset to generate a masked output signal Hm. An index signal Va is obtained at, or in association with, the falling edge of this masked output signal Hm.

Since the masked output signal Hm is delayed relative to the rise (i.e. zero crossing point) of the associated waveform shaping signal D by a predetermined delay time τ of the mask signal M1, the delay must be taken into account in subsequent signal processing.

In the fourth embodiment of the invention, the first mask circuit 81 may be omitted, because the masked output signal Hm can be obtained based on the masked level comparison signal Em and the falling-edge signal F associated with the waveform shaping signal D even if a noise-originating pulse signal is contained in the waveform shaping signal D.

Thus, the signal synthesizing circuit 60A generates the masked level comparison signal Em by masking possible noise contained in the level comparison signal E with the mask signals M1 and M2, and generates an index signal Va based on the ending of the waveform shaping signal D, or of the masked waveform shaping signal Dm, immediately after the formation of the masked level comparison signal Em.

Incidentally, in the fourth embodiment of the invention, there can be generated, immediately after the generation of the level comparison signal E, further noise N3 that causes a spike in the input signal Vin that goes below zero level C once and then overshoot the threshold level Vth (as shown in FIG. 7) when the coil 10 is facing the intensified magnetic pole. If such noise N3 is generated, the masked output signal Hm is generated with slight delay. This delay of the masked output signal Hm generated will lower the accuracy of detection of the rotational position, though not resulting in an erroneous detection of the position.

Such lowering of detection accuracy can be circumvented by configuring the motor such that the noise-generating switching of the motor will not coincide, in timing, with noise N3. If other noises should occur at different instants than that of noise N3, the noises would be successfully masked out.

Figure 8:
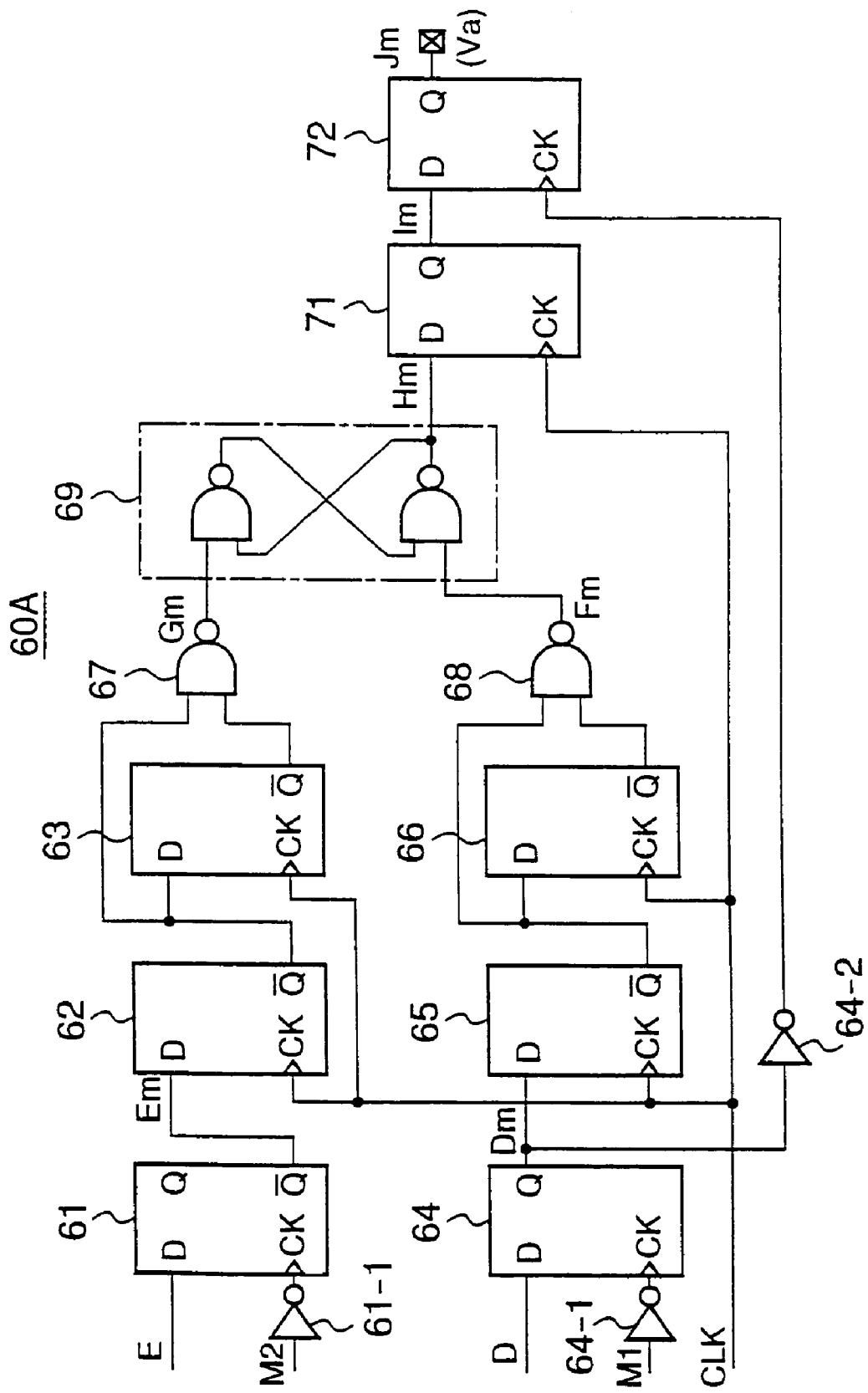
FIG. 8 is a circuit diagram of a signal synthesizing circuit for use with a rotational position detector in accordance with a fifth embodiment of the invention.
Figure 9:
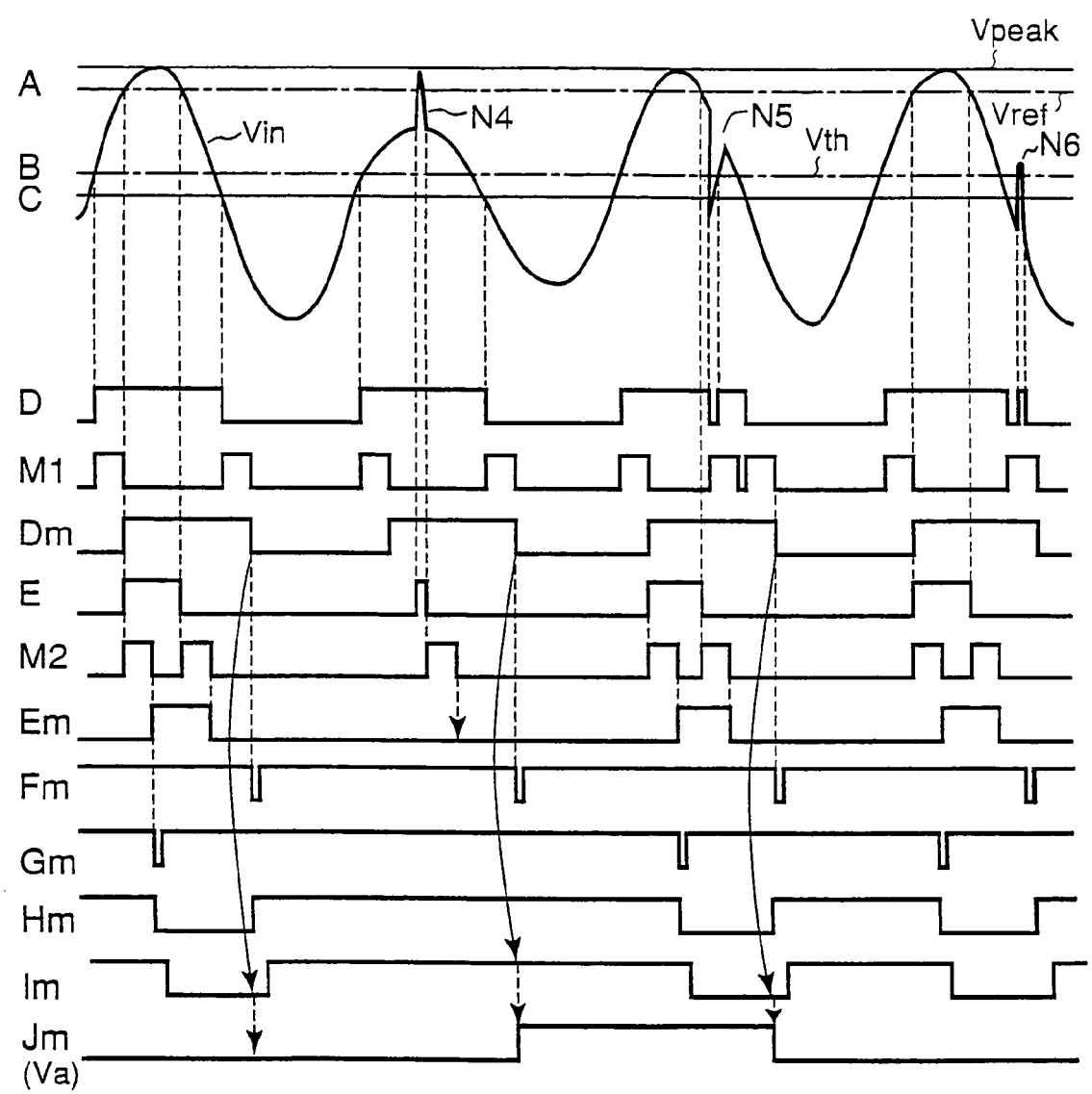
FIG. 9 is a timing diagram describing the operational principle of a rotational position detector in accordance with the fourth embodiment of the invention.

FIG. 8 shows the internal structure of a signal synthesizing circuit 60A for use with a rotational position detector in accordance with the fifth embodiment of the invention. FIG. 9 shows a timing diagram describing the operational principle of the signal synthesizing circuit 60A. The arrangement of this rotational position detector is the same as that of the fourth example shown in FIG. 5, except that one of the magnetic poles (referred to as weak magnetic pole) provides a smaller magnetic flux than other magnetic poles.

The structure of the signal synthesizing circuit 60A of the fifth embodiment shown in FIG. 8 is basically the same as that of FIG. 6, but differs in the following points. First, the D-type FF 62 is supplied with the masked level comparison signal Em from the inverted output terminal of the D-type FF 61. Second, the signal synthesizing circuit 60A is further provided with a D-type FF 71 which receives at the data input terminal thereof the signal Hm from the inverted output terminal of the SR-FF 69 along with the clock CLK, and a D-type FF 72 which receives at the data input terminal thereof a signal Im from the D-type FF 71 and at the clock terminal a signal which is obtained by inverting the masked waveform shaping signal Dm by the inverting circuit 64-1. The signal Jm output from the D-type FF 72 is used as an index signal Va.

Operation of the fifth embodiment will now be described with reference to FIG. 8 and FIG. 9. It should be understood that the operation will be described with emphasis placed on major differences between the fourth embodiment shown in FIGS. 6 and 7 and the fifth embodiment.

The signals A through Gm are the same in nature as of FIG. 7. However, as shown in FIG. 9, waveforms and frequencies of occurrences of the respective signals are different from those shown in FIG. 7 for the reason that one of the magnetic poles provides a smaller flux than other magnetic poles.

FIG. 9 illustrates an input signal Vin superimposed with noise N4 that exceeds the reference signal Vref and noises N5 and N6 that vary from below zero level to a level exceeding the threshold level Vth.

Noise N4 results in a noise-originating pulse having the same width as the noise N4 in the level comparison signal E. In the fifth embodiment, if a noise-originating pulse level comparison signal E is generated by noise N4, the noise-originating signal is masked by the second mask signal M2 as shown in FIGS. 6 and 7. As a consequence, no signal due to noise N4 will be generated in the masked level comparison signal Em.

Noises N5 and N6 result in noise-originating pulses each having the same width as the associated noise width, in the waveform shaping signal D. Such noise-originating pulses interfere with the waveform shaping signal D constructively (noise N6) or destructively (noise N5). However, since these noise-originating pulses due to noises N5 and N6 are removed by the first mask signal M1, no matter how they interfere with the waveform shaping signal D, i.e. constructively or destructively, no noise signal will be generated in the masked waveform shaping signal Dm.

In the example shown, the signal Gm is a rising-edge signal that goes low (or falls) at a rising edge of the masked level comparison signal Em.

The signal Hm is a pulsed signal that is generated (or falls) at a falling edge of the rising-edge signal Gm and rises (or ends) at a falling edge of the falling-edge signal Fm.

The signal Im is a delayed signal obtained by delaying the signal Hm by a predetermined short period of time. This delay is generated using the D-type FF 71 and the clock CLK.

Signal Jm is an output signal generated in accord with the level of the delayed signal Im at the time an associated falling-edge signal Fm is generated. This signal Jm is output as the index signal Va of the fifth embodiment.

The input signal Vin is varied by the rotation of the motor, as shown in FIG. 9. While the coil 10 is facing a magnetic pole other than the weak magnetic pole, the input signal Vin reaches the level of the reference signal Vref.

Thus, the masked level comparison signal Em is formed while the masked waveform shaping signal Dm is formed. Accordingly, the pulsed signal Hm and the delayed signal Im, which are pulled down at a falling edge of the signal Gm and go high at a falling edge of the signal Fm, are generated.

In this case, the output signal Jm is not generated, since the delayed signal Im is pulled low (L) when the falling-edge signal Fm is generated.

As the motor rotates, causing the coil 10 to face the weak magnetic pole, the masked waveform shaping signal Dm is formed, but the masked level comparison signal Em is not formed. Then, since the rising-edge signal Gm is not generated, the delayed signal Im still remains high (H).

As a consequence, the output signal Jm will rise at the next falling-edge of the signal Fm. This output signal Jm will fall when the coil 10 faces next a magnetic pole providing a larger magnetic flux than the weak magnetic pole.

In this case, due to the fact that then the rising-edge signal Gm is not generated, the output signal Jm is generated when the next falling-edge signal Fm is generated. The index signal Va is obtained at the rise, or in association with the rise, of the output signal Jm.

As described above, the signal synthesizing circuit 60A uses the first mask signal M1 to mask noises N5 and N6 contained in the waveform shaping signal D to form the masked waveform shaping signal Dm, and uses the second mask signal M2 to mask noise N4 contained in the level comparison signal E to form the masked level comparison signal Em. When the masked level comparison signal Em is not formed during a period between the generation and the ending of the masked waveform shaping signal Dm, the index signal Va is generated based on the ending of the masked waveform shaping signal Dm.

Figure 10:
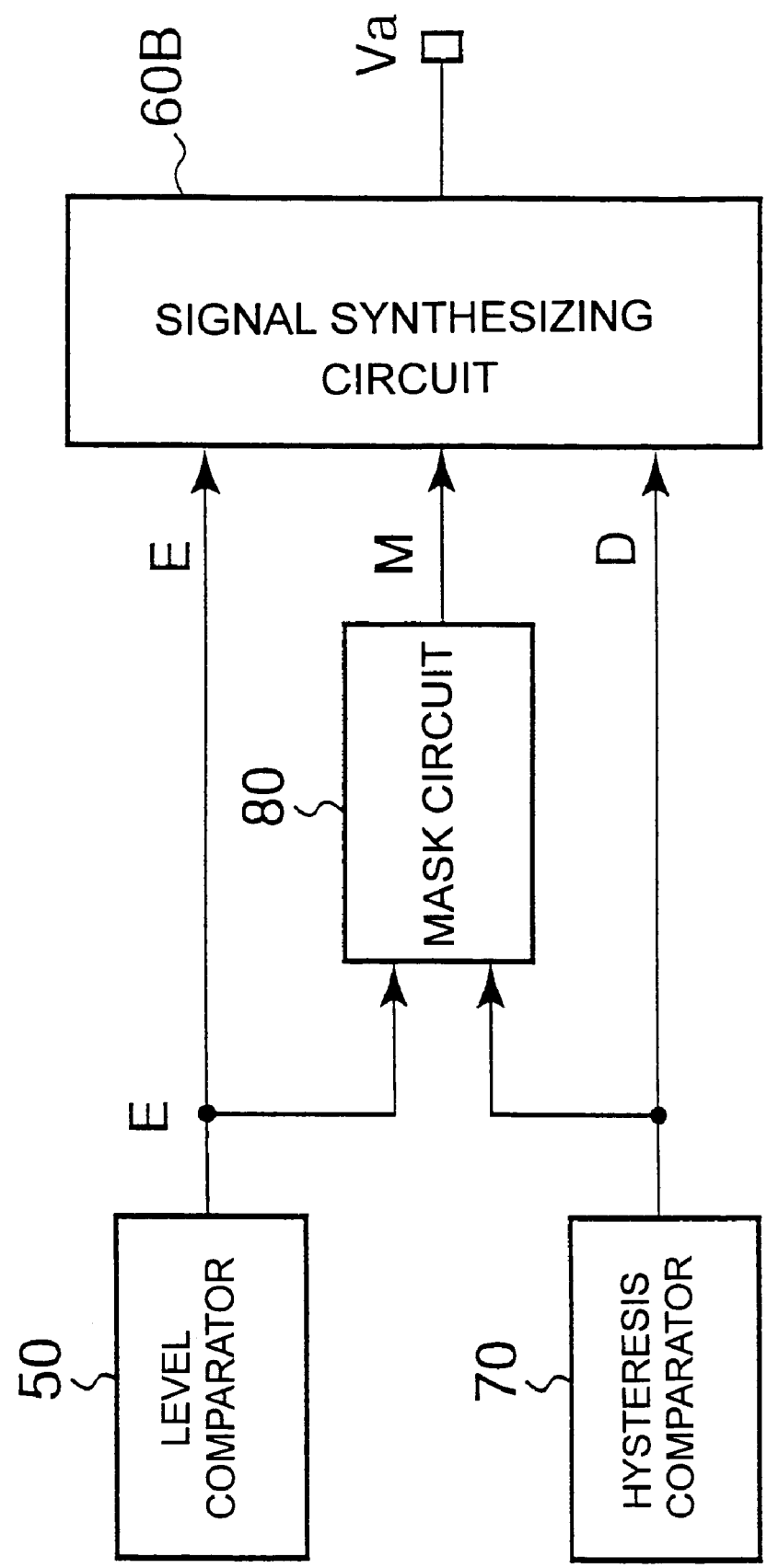
FIG. 10 is a block diagram representation of a shared mask circuit.

FIG. 10 shows a modification in which a mask circuit 80 is used for forming a single mask signal for masking different types of noises. It will be recalled that in the fourth and fifth embodiments the first and second mask circuits are provided to generate the first and the second mask signals M1 and M2, respectively. However, as shown in FIG. 10, the mask circuit 80 can form a mask signal M adapted to function as the first and second mask signals M1 and M2 of the foregoing embodiments. In this case, the mask signal M is formed by every rising edge and falling edge of the waveform shaping signal D and the level comparison signal E. As in the fourth and fifth embodiments, noise can be masked using this mask signal M, thereby reducing the number of mask circuits.

In the example shown in FIG. 10, however, it is necessary, in view of the timing relationship between noise and the masking time, that a rising edge or a falling edge of the waveform shaping signal D and of the level comparison signal E must not coincide with the masking time of the mask circuit 80.

It is noted that in any of the embodiments described above, the one-sided hysteresis comparator can be replaced by a double-sided hysteresis comparator.

Each of the rotational position detectors described above can be mounted on different disk drives including FDDs and HDDs of various information recording-reproducing apparatuses.

What is claimed is:

1. A rotational position detector for detecting a reference rotational position of a rotor of a motor, said rotor having a multiplicity of magnetic poles arranged along a circumference of said rotor such that one of said magnetic poles or a pair of said magnetic poles generates a magnetic flux different in magnitude from those generated by other magnetic poles, said rotational position detector comprising:
   coil means provided at a predetermined position external to said rotor, for generating therein an induction signal associated with the change in said flux caused by the rotation of said rotor, and
   a signal processing circuit for generating upon receipt of said induction signal, an index signal indicative of said reference rotational position based on the change in said induction signal,
   wherein said multiplicity of magnetic poles are of permanent magnets, with one magnetic pole or a pair of magnetic poles providing a larger magnetic flux than other magnetic poles; and
   said signal processing circuit has
   a peak hold circuit receiving an input signal associated with said induction signal and holding the peak value of said input signal,
   a reference signal generation circuit for generating a reference signal in accordance with said peak value,
   a level comparator for generating a level comparison signal based on the level comparison of said input signal and said reference signal,
   a mask signal generation circuit for generating a mask signal having a predetermined pulse width starting from the time when said level comparison signal changes in level,
   a waveform shaper for waveform shaping said input signal based on a predetermined threshold to generate a waveform shaping signal, and
   a signal synthesizing circuit for generating said index signal based on said level comparison signal, mask signal, and waveform shaping signal.

2. The rotational position detector according to claim 1, wherein said signal synthesizing circuit is adapted to:
   form a masked level comparison signal by masking the noise contained in said level comparison signal with said mask signal; and
   generate said index signal based on the ending of said waveform shaping signal immediately after the formation of said masked level comparison signal.

3. A rotational position detector for detecting a reference rotational position of a rotor of a motor, said rotor having a multiplicity of magnetic poles arranged along a circumference of said rotor such that one of said magnetic poles or a pair of said magnetic poles generates a magnetic flux different in magnitude from those generated by other magnetic poles, said rotational position detector comprising:
   coil means provided at a predetermined position external to said rotor, for generating therein an induction signal associated with the change in said flux caused by the rotation of said rotor, and
   a signal processing circuit for generating, upon receipt of said induction signal, an index signal indicative of said reference rotational casition based on the change in said induction signal,
   said multiplicity of magnetic poles are of permanent magnets, with one magnetic pole or a pair of magnetic poles providing a smaller magnetic flux than other magnetic poles; and
   said signal-processing circuit has
   a peak hold circuit receiving an input signal associated with said induction signal and holding the peak value of said input signal;
   a reference signal generation circuit for generating a reference signal in accordance with said peak value;
   a level comparator for generating a level comparison signal based on the level comparison of said input signal and reference signal;
   a waveform shaper for waveform shaping said input signal based on a predetermined threshold to generate a waveform shaping signal;
   a first mask signal generation circuit for generating a first mask signal having a predetermined width starting from the time when said level comparison signal changes in level;
   a second mask signal generation circuit for generating a second mask signal having a predetermined width staring from the time when said waveform shaping signal changes in level; and
   a signal synthesizing circuit generating said index signal based on said level comparison signal, second mask signal, waveform shaping signal, and first mask signal.

4. The rotational position detector according to claim 3, wherein said signal synthesizing circuit is adapted to:
   form a masked waveform shaping signal by masking the noise contained in said waveform shaping signal with said first mask signal;
   form a masked level comparison signal by masking the noise contained in said level comparison signal with said second mask signal, and
   generate said index signal based on the ending of said masked waveform shaping signal when said masked level comparison signal is not formed during the period between the beginning and the ending of said masked waveform shaping signal.

5. A recording-reproducing unit equipped with a rotational-recording medium drive having a rotational position detector according to any one of claims 1 through 4.

* * * * *